(12) United States Patent
Edelstein et al.

(10) Patent No.: US 8,196,866 B2
(45) Date of Patent: Jun. 12, 2012

(54) EXTENDIBLE SWAY BRACE FOR AN AIRBORNE PAYLOAD RACK AND A RACK CONTAINING SAME

(75) Inventors: Ervin Edelstein, Kir'on (IL); Mordechai Berenson, Ra'anana (IL); Haim Maslovitz, Lod (IL); David Elnekave, Hod Hasharon (IL)

(73) Assignee: Israel Aerospace Industries Ltd., Lod (IL)

( * ) Notice: Subject to any disclaimer, the term of this patent is extended or adjusted under 35 U.S.C. 154(b) by 1183 days.

(21) Appl. No.: 11/547,173

(22) PCT Filed: Jan. 27, 2005

(86) PCT No.: PCT/IL2005/000094
§ 371 (c)(1),
(2), (4) Date: Oct. 2, 2006

(87) PCT Pub. No.: WO2005/095208
PCT Pub. Date: Oct. 13, 2005

(65) Prior Publication Data
US 2007/0272800 A1    Nov. 29, 2007

(30) Foreign Application Priority Data
Apr. 4, 2004 (IL) .......................................... 161282

(51) Int. Cl.
*B64D 1/02* (2006.01)
(52) U.S. Cl. ..... 244/137.4; 89/1.53; 89/1.54; 294/82.26
(58) Field of Classification Search ................... 244/136, 244/137.4; 89/1.53, 1.54; 294/82.26
See application file for complete search history.

(56) References Cited

U.S. PATENT DOCUMENTS

| | | | | |
|---|---|---|---|---|
| 2,749,063 A | * | 6/1956 | Low | 244/137.4 |
| 2,869,426 A | * | 1/1959 | Wilkie | 89/1.57 |
| 3,010,752 A | * | 11/1961 | Geffner | 294/82.28 |
| 3,056,623 A | * | 10/1962 | Herbert | 294/82.26 |
| 3,242,808 A | * | 3/1966 | Nelson et al. | 89/1.51 |
| 3,494,248 A | * | 2/1970 | Wenger | 89/1.51 |
| 3,967,528 A | | 7/1976 | Baker | |
| 4,088,287 A | * | 5/1978 | Hasquenoph et al. | 244/137.4 |
| 4,196,879 A | | 4/1980 | Craigie | |
| 4,233,883 A | | 11/1980 | Miko | |
| 4,257,639 A | * | 3/1981 | Stock | 294/82.26 |
| 4,441,674 A | | 4/1984 | Holtrop | |
| 4,520,711 A | * | 6/1985 | Robinson | 89/1.55 |
| 4,552,327 A | * | 11/1985 | Carter | 244/137.4 |

(Continued)

FOREIGN PATENT DOCUMENTS
WO    WO 2005095208 A1 * 10/2005

*Primary Examiner* — Timothy D Collins
*Assistant Examiner* — Joseph W Sanderson
(74) *Attorney, Agent, or Firm* — The Nath Law Group

(57) ABSTRACT

An extendable sway brace for a rack for an airborne payload. The sway brace is extendable. A mechanism for extending the sway brace includes means for preventing extension of the sway brace when the pressure exerted by the brace on a payload reaches a predetermined pressure. The means for preventing extension of the brace may include, for example, one or more pre-loaded springs. In this case, extension of the brace is prevented when the springs are compressed by a predetermined amount. The invention also provides a rack for an airborne payload comprising a sway brace of the invention.

9 Claims, 2 Drawing Sheets

U.S. PATENT DOCUMENTS

| | | | |
|---|---|---|---|
| 4,572,053 A * | 2/1986 | Sosnowski et al. | 89/1.51 |
| 4,850,553 A * | 7/1989 | Takata et al. | 244/137.4 |
| 4,964,595 A * | 10/1990 | Nordhaus | 244/137.4 |
| 5,052,639 A * | 10/1991 | Lemacon | 244/137.4 |
| 5,107,749 A * | 4/1992 | Norrvi | 89/1.57 |
| 5,395,149 A * | 3/1995 | Herman et al. | 294/82.26 |
| 5,904,323 A * | 5/1999 | Jakubowski et al. | 244/137.4 |
| 5,932,829 A * | 8/1999 | Jakubowski, Jr. | 89/1.54 |
| 6,035,759 A * | 3/2000 | Jakubowski et al. | 89/1.54 |
| 6,119,982 A * | 9/2000 | Jakubowski et al. | 244/137.4 |
| 6,460,445 B1 * | 10/2002 | Young et al. | 89/1.51 |
| 6,481,669 B1 * | 11/2002 | Griffin | 244/137.4 |
| 6,663,049 B1 * | 12/2003 | Jakubowski et al. | 244/137.4 |
| 6,758,441 B2 * | 7/2004 | Jakubowski et al. | 244/137.4 |
| 6,764,048 B2 * | 7/2004 | Jakubowski et al. | 244/137.4 |
| 6,796,530 B2 * | 9/2004 | Jakubowski et al. | 244/137.4 |
| 6,811,123 B1 * | 11/2004 | Foster et al. | 244/137.4 |
| 6,889,592 B2 * | 5/2005 | Isker et al. | 89/1.53 |
| 6,892,985 B2 * | 5/2005 | Jakubowski, Jr. | 244/137.4 |
| 7,083,148 B2 * | 8/2006 | Bajuyo et al. | 244/137.4 |
| 7,147,188 B2 * | 12/2006 | Jakubowski et al. | 244/137.4 |
| 7,677,501 B1 * | 3/2010 | Hundley et al. | 244/137.4 |

* cited by examiner

EXTENDIBLE SWAY BRACE FOR AN AIRBORNE PAYLOAD RACK AND A RACK CONTAINING SAME

FIELD OF THE INVENTION

This invention relates to aircraft mounted racks for carrying and releasing a payload from an airborne aircraft.

BACKGROUND OF THE INVENTION

A payload, such as a bomb, may be suspended from below an aircraft before takeoff and subsequently released from the aircraft when airborne. The payload is provided with one or more lugs on an upper surface. The payload is mounted on the aircraft by engaging the lugs in hooks that are part of a payload rack attached to a bottom surface of the aircraft. The rack includes "sway braces" that extend from the rack and that are affixed firmly to the payload. This reduces or prevents swaying of the payload that would otherwise occur due to vibrations of the aircraft during takeoff and during flight. The payload is released from the rack by activating a release mechanism that opens the hooks. In order to prevent the released payload from coming into contact with the aircraft, the rack may include an ejection mechanism. The ejection mechanism includes a piston that immediately after the opening of the hooks is made to descend rapidly and strike an upper surface of the payload with a sufficiently large force so as to impart to the released payload a large downward momentum. Movement of the piston rod may be caused by a pyrotechnic mechanism in which an explosion is made to occur within the piston, or by a pneumatic source.

The rack typically has two pairs of sway braces. One pair contacts the payload at its forward end, while the second pair contacts the payload at its rear end. In order to accommodate payloads of different sizes, both pairs of sway braces are extendable. After mounting the payload, the sway braces are extended from the rack until they are firmly affixed to the upper surface of the payload. The sway braces are then secured in position.

SUMMARY OF THE INVENTION

The present invention provides an extendable sway brace for use in a rack for an airborne payload. In accordance with the invention, the sway brace is configured so as to prevent the sway brace from exerting excessive pressure on the payload. This is particularly beneficial for light payloads having a thin outer casing. In a preferred embodiment of the invention, the sway brace includes a mechanism for extending the brace comprising one or more preloaded springs. As the sway brace is extended and contacts the payload, the spring or springs start to become compressed. As the pressure exerted by the brace on the payload increases, the compression of the springs also increases. When the compression of the springs reaches a predetermined value, the brace is prevented from being extended further. This is by way of example only, and any mechanism for preventing the sway brace from exerting excessive pressure on the payload may be used in accordance with the invention. For example, excessive pressure may be prevented by means of a friction clutch incorporated into the mechanism that extends the brace.

The invention also provides a rack for an airborne payload comprising the sway brace of the invention. The rack of the present invention is particularly suited for light payloads. A rack of the invention intended for carrying a light payload may have only one hook.

The rack of the invention may include a pair of extendable sway braces of the invention together with a pair of fixed sway braces. Having one pair of extendable sway braces instead of two shortens the attachment procedure of the payload to the rack, while still allowing the rack to accommodate payloads of different sizes.

The rack of the invention may also have an ejection mechanism. The ejection mechanism comprises a piston that is activated by introducing into the piston a pressurized gas such as Nitrogen.

The invention thus provides an extendible sway brace for a rack for an airborne payload, the sway brace having a mechanism for extending the sway brace comprising means for preventing extension of the sway brace when the pressure exerted by the brace on the payload reaches a predetermined pressure.

The invention also provides a rack for an airborne payload comprising a sway brace of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
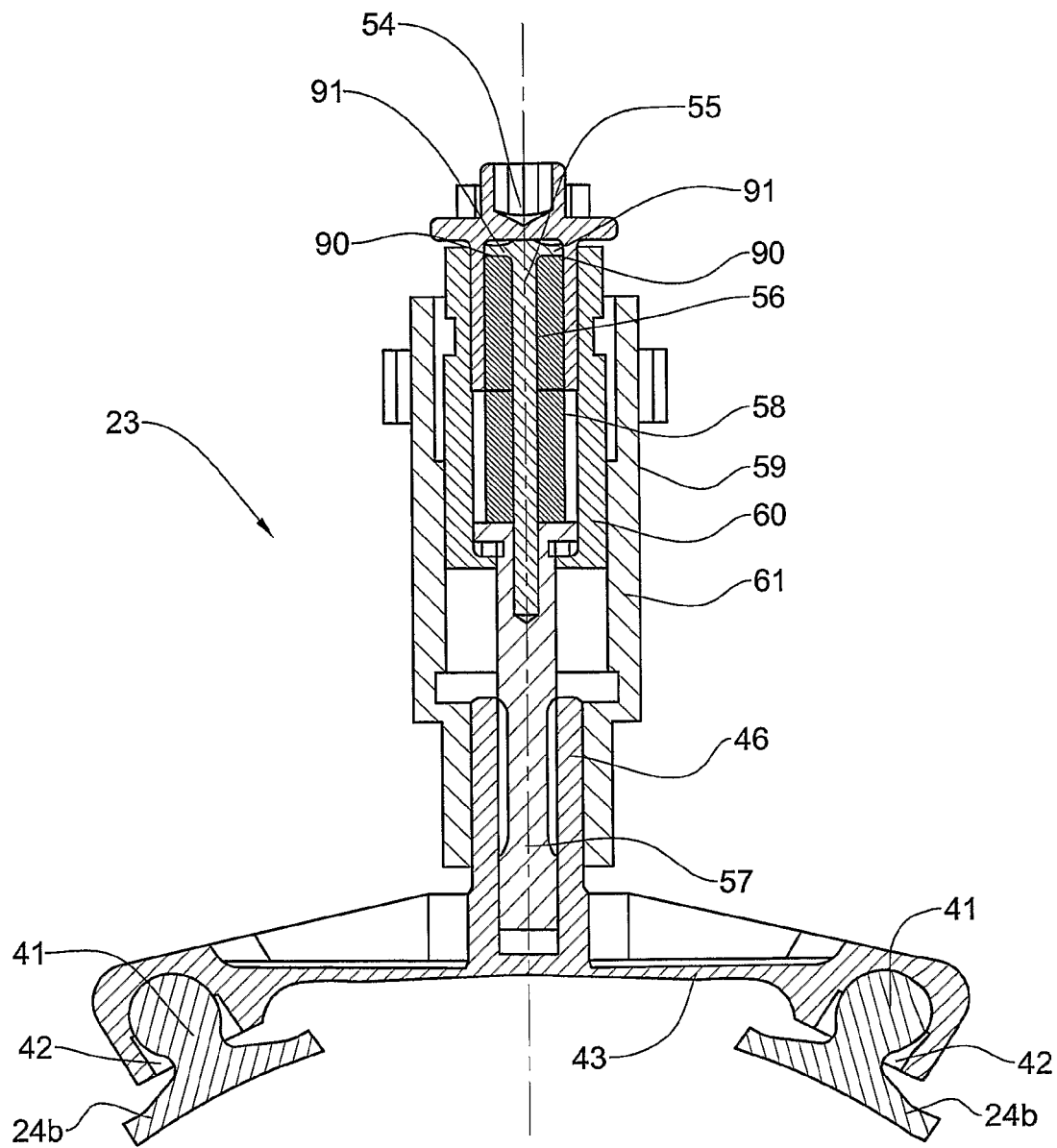
FIG. 1 shows a pair of extendable sway braces in accordance with the invention.

FIG. 1 shows an extendable pair 23 of sway braces in accordance with one embodiment of the invention. The sway brace 23 may be used in a rack for an airborne payload. Pads 24b have a bulb like extension 41 that are snap fitted into sockets 42 in a cross-arm 43. The pads 24 are thus attached to the cross-arm 43 in a ball and socket joint. This allows the pads 24 to swivel and adapt their positions so as to accommodate payloads of different shapes.

For affixing the pads 24b on a payload, a wrench or other suitable tool is used to turn a cap 54. Sleeve 60 is attached and secured to cap 54, so that rotation of the cap 54 causes rotation of the threaded sleeve 60. Sleeve 60 rotates in a cylindrical passageway 61 having a matching threaded surface, so that rotation of the sleeve 60 is coupled with descent of the sleeve 60 in the cylindrical passageway 61.

Preloaded springs 58 are attached at an upper end 90 to an upper surface 91 of the sleeve 60. A control rod 55 extends from the upper surface 91 in order to maintain the springs 58 in the correct position inside the sleeve 60. The downward movement of the sleeve 60 causes downward movement of the preloaded springs 58 which press upon an extension element 57 so as to cause downward movement of the extension element 57. Downward movement of the extension element 57 causes, in turn, downward movement of the cross arm 43 causing the pads 24 to contact the payload.

At this point, further rotation of the cap 54 increases the pressure of the pads 24a and 24b on the payload and when this pressure exceeds a pre-set value, the springs 58 become compressed beyond their preloaded length, and no longer cause further downward movement of the extension element 57. In this way, the pressure of the pads 24b does not exceed a predetermined limit.

Figure 2:
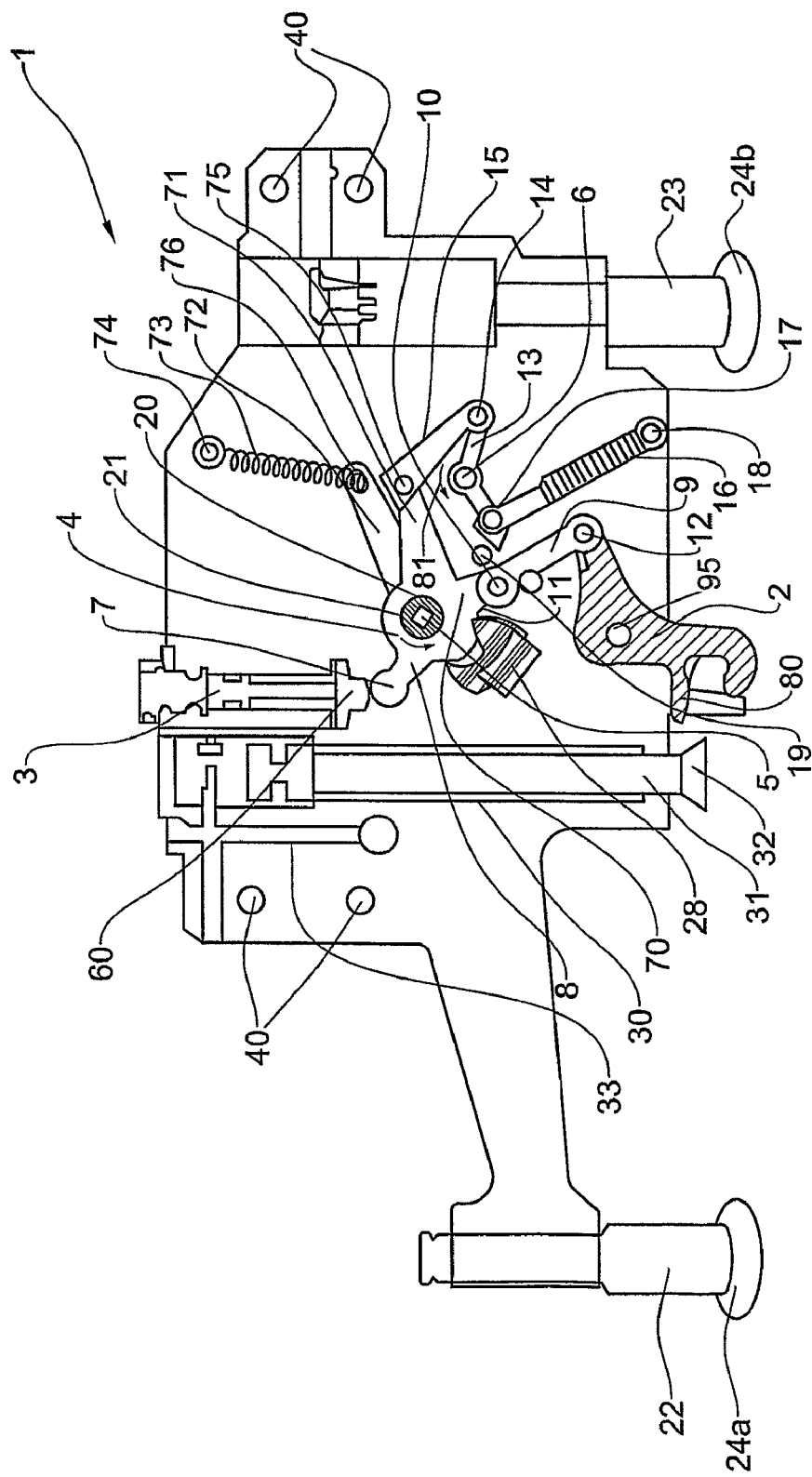
FIG. 2 shows a rack for an airborne payload comprising a pair of extendable sway braces in accordance with one embodiment of the invention.

FIG. 2 shows a rack 1 for an airborne payload comprising the extendable sway brace of the invention. The rack 1 includes holes 40 for attachment of the rack to an aircraft. The rack 1 includes a hook 2 from which a payload (not shown) may be suspended. The hook 2 is pivotable around a pivot 95 between a closed position shown in FIG. 2, and an open position (not shown).

Bell-crank 4 and bell-crank 70 are pivotable around a common pivot 5. Bell-crank 4 drives the hook 2 mechanism, and has 2 extensions: 11 and 72. Bell-crank 70 drives a locker 13 mechanism, and has 2 extensions: 7 and 71. When bell-crank 70 rotates in the direction of arrow 8, extension 71 of bell-crank 70 pushes extension 72 of bell-crank 4 causing the bell-crank 4 to rotate about a pivot 5 in the direction of the arrow 8

A link 9 is attached at one end at a pivot 10 to an extension 11 of the bell-crank 4. At another end, the link 9 is attached at a pivot joint 12 to the hook 2.

Extension 72 of Bell-crank 4 is attached to a spring 73 by means of a pivot joint 76. Another end of the spring 73 rotates around a pivot 74. The spring 73 supplies a toggling feature to the hook 2 between it's opened and closed positions, and secures the hook mechanism in its open position and in its closed position.

A locker 13 is pivotable around a pivot 6. The locker 13 has one extension connected by a pivot joint 14 on an end of a link 15. At another end, the link 15 is attached at a pivot joint 75 to the extension 71 of bell-crank 70. Another extension of the locker 13 is attached to a spring 16 by means of a pivot joint 17. Another end of the spring 16 rotates around a pivot 18. The spring 16 prevents rotation of the locker 13 in the direction of the arrow 80 when the piston 3 is in its up position. This in turn prevents inadvertent rotation of the bell-crank 70 in the direction of the arrow 8 (hook opening), so as to prevent inadvertent opening of the hook 2 when the hook is in the closed position shown in FIG. 2.

Movement of the hook 2 between its open and closed positions is regulated by means of an actuating mechanism. The actuating mechanism includes a piston 3 having an up position shown in FIG. 2 corresponding to the closed position of the hook 2. Actuation of the piston 3 by the introduction of pressurized gas into the piston 3 causes the piston to move from its up position to a down position (not shown) 2 corresponding to the open position of the hook 2.

The distal end of the shaft 60 of the piston 3 contacts the extension 7 of the bell-crank 70. Activation of the piston 3 into its lowered position depresses the extension 7 of the bell-crank 70 so as to cause the bell-crank 70 to rotate about pivot 5 in the direction of the arrow 8. As the bell-crank 70 rotates in the direction of the arrow 8, the following happens:

a. Link 15 causes locker 13 to rotate about the pivot 6 in the direction of the arrow 81 from its closed position shown in FIG. 2 to its open position (not shown), enabling the hook to rotate to its opened position b. Extension 71 of bell-crank 70 causes bell-crank 4 to rotate about the pivot 5 in the direction of the arrow 8 c. Link 9 causes the hook 2 to rotate about the pivot 95 from its closed position shown in FIG. 2 to its open position (not shown).

A hole 19 in the frame is configured to receive a safety pin (not shown) which, when inserted in the hole 19, prevents rotation of the bell-crank 4 in the direction of the arrow 8 so as to lock the hook 2 in its closed position. The pin can only be inserted into the hole 19 when the hook 2 is in its closed position.

A hub 20 over the pivot 5 has a square protrusion 21. The square protrusion 21 may be grasped by a wrench (not shown) and rotated in the direction of the arrow 8, so as to rotate the control arm 4 in the direction of the arrow 8 for manual opening of the hook 2. The rack also has a sensor 28 for generation of an electrical signal indicative of the state of the hook 2 (open or closed).

The rack also includes two pairs of sway braces 22 and 23 for stabilizing a payload suspended from the hook 2. (Only one sway brace is visible in each of the pairs 22 and 23 in the perspective shown in FIG. 2). The sway brace pair 22 is positioned in the rack as required for the dimensions of the payload, and is then clamped in this position. The sway brace pair 23 is extendable, as explained above in reference to FIG. 1, and serves to perform payload preloading. As the pads 24*b* press upon the payload, the payload may swing in the hook 2 until the pads 24*a* on the pair 22 of fixed sway braces contact the payload. The position of the adjustable pair 23 of sway braces is determined so that pads 24*a* attached to the tips of the pair 22 of sway braces, and pads 24*b* attached to the tips of the pair 22 of sway braces are in firm contact with the payload.

The rack 1 also includes an ejector 30 for ejecting the payload immediately after the opening of the hook 2. The ejector 30 reduces the risk of the released payload coming into contact with the aircraft after release. The ejector 30 includes a piston 31 having an upper position shown in FIG. 2, in which a pad 32 located at the exposed end of the piston shaft is not in contact with the payload. The piston 31 is bought from its upper position to lowered position by means of a pressurized gas such as Nitrogen that is conducted from a reservoir (not shown) into the ejector 30 via a connecting hose 33. The ejector 30 is activated immediately after the opening of the hook 2, so as to cause the piston 31 to descend rapidly and strike an upper surface of the payload with a sufficiently large force so as to impart to the released payload a large downward momentum. The piston 31 is positioned to strike the payload close to its center of gravity.

The use of a pressurized gas such as Nitrogen to activate the ejector 30 prevents the formation of soot and other impurities that are formed during a pyrotechnic reaction. Such impurities in the piston may cause the piston 31 to become stuck and may cause corrosion inside the piston. For a light payload, an ejector activated by a pressurized gas such as Nitrogen is more suitable than an ejector that is activated by a pyrotechnic explosion. Another advantage in using a pressurized gas is that the behavior of the ejector is more predictable. When using a pyrotechnic unit, for example, the presence of moisture may affect the behavior of the pyrotechnic device.

For suspension of a payload on the rack, the payload is moved upwards, in a way that a lug firmly attached to the top of the payload is pushed against the extension 80 of the hook 2, causing the hook to close spontaneously and latch closed under the influence of the spring 73.

At this point, the payload is suspended on the hook 2. The hook is secured by two means:

a. Geometric locking: the pivot 10 is over-centered relative to the line between pivots 12 and 5.

b. Locker 13 is in its closed position

The invention claimed is:

1. An extendable sway brace for a rack for an airborne payload, the sway brace being extendable and comprising:
    a first mechanism for extending the sway brace so as to apply pressure to the payload in at least two directions; and
    a second mechanism for preventing extension of the sway brace when the pressure exerted by the brace on the payload reaches a predetermined positive pressure.

2. The sway brace according to claim 1 wherein the second mechanism for preventing extension of the sway brace includes one or more pre-loaded springs and extension of the sway brace is prevented when the springs are compressed by a predetermined amount.

3. A rack for an airborne payload comprising an extendable sway brace according to claim 1.

4. The rack according to claim 3 further comprising one or more fixed sway braces.

5. The rack according to claim 3 further comprising a payload ejector.

6. The rack according to claim 5 wherein the payload ejector includes a piston activated by a pressurized gas.

7. The rack according to claim 6 wherein the gas is nitrogen.

8. The rack according to claim 3 having one hook for attachment of a payload.

9. An extendable sway brace for a rack for an airborne payload, the sway brace comprising:
- a first mechanism for extending the sway brace so as to apply pressure to the payload in at least two directions; and
- a second mechanism for preventing over pressure of the sway braces on the payload, so the pressure of sway brace pads of the sway brace does not exceed a predetermined positive limit.

* * * * *